United States Patent [19]
Minnich

[11] Patent Number: 5,768,866
[45] Date of Patent: Jun. 23, 1998

[54] AQUA FARM FILTERING

[76] Inventor: Walter W. Minnich, 403 Executive Dr., Marion, Ohio 43302

[21] Appl. No.: 717,568

[22] Filed: Sep. 23, 1996

[51] Int. Cl.[6] .................................................. A01D 46/00
[52] U.S. Cl. .............................. 56/8; 56/328.1; 56/330; 56/DIG. 2
[58] Field of Search .................................. 56/8, 9, 327.1, 56/328.1, 329, 330, DIG. 2; 47/1 F, 4

[56] References Cited

U.S. PATENT DOCUMENTS

| | | | |
|---|---|---|---|
| 3,757,504 | 9/1973 | Rauth | 56/328.1 |
| 3,871,040 | 3/1975 | Marasco | 56/328.1 |
| 3,943,688 | 3/1976 | Billings | 56/328.1 |
| 4,175,368 | 11/1979 | Scheffler | 56/328.1 |
| 5,036,618 | 8/1991 | Mori | 47/1.1 |
| 5,125,223 | 6/1992 | McKenna et al. | 56/328.1 |
| 5,499,490 | 3/1996 | Minnich | 56/9 |

*Primary Examiner*—Terry Lee Melius
*Attorney, Agent, or Firm*—Philip M. Dunson; Philip J. Pollick

[57] ABSTRACT

A system for aqua farming comprises at least one land mass; typically a plurality of approximately rectangular land masses with their sides typically at least about an order of magnitude longer than their ends and defining approximately parallel channels between them in an adjacent body of water. The water moves into the channels and, in a substantial region of each land mass, also moves through it from the channel on one side to the channel on the other side thereof. Filtering means such as sand, gravel, or a mixture of sand and gravel, block the movement through the land masses of most of the pieces of solid matter that may be present in the water, whose smallest cross section is larger than a predetermined size.

18 Claims, 2 Drawing Sheets

AQUA FARM FILTERING

RELATED PATENT

This invention is related to U.S. Pat. No. 5,499,490, issued Mar. 19, 1996, of Walter W. Minnich, for Aqua Farming, which is hereby incorporated by reference herein.

FIELD

The present invention relates to methods and articles of manufacture used in aqua farming. It has to do particularly with methods and means for filtering the supply of water used in growing plants on a land mass adjacent to a body of water so that food products from the plants can be gathered from the water. The water that is filtered may also be used in various other ways such as those described or mentioned in the patent of Minnich cited above.

As the agricultural land masses of the world available for farming become more scarce because of wind and water erosion and increasing population growth and associated urbanization, marginal farm land including swamps and steep hillsides must be put to effective agricultural use. Current farming methods require large amounts of capital equipment and labor and typically employ large amounts of fertilizers and insecticides that may cause further problems for wildlife populations. Traditional mechanical methods of farming often leave bruised and battered edible plant parts. Heretofore little has been done in agricultural technology to take advantage of the natural balance of plant and animal life in the overall relation of living things, especially the balance between aquatic and land environments.

Many inventions have been developed for the improvement of farming. Most are directed toward narrow and limited features of a specific process, and few take into account the various factors that must be integrated to provide a complete system of farming with only a bare minimum of negative effects on both the ecology and the harvested food product.

As the Minnich patent points out, the prior art does not teach or suggest an overall system for growing plants on a land mass in a way that allows a portion of the plant, such as an apple or other fruit, to be separated from the plant in a manner that allows the plant part to enter and be harvested from a body of water, thereby reducing damage to the plant part, and reducing harvesting cost. Nor does the prior art suggest the other features of aqua farming that are described in the Minnich patent.

The patent of Minnich is directed to methods, articles of manufacture, apparatus, and systems for farming in which plants are grown on a land mass adjacent to a body of water so that separated plant parts such as apples fall into the water and are harvested from the water. The land mass is sloped so that the plant parts are encouraged to enter the water. The body of water is contained in uniform canals and can be used for raising aquatic food products such as fish. Locks or a flow tube are used to interconnect water at different levels.

Food products are harvested from the water using a boat, a conveyor, or a water elevator that has a tube for receiving food product from the water and lifting it to a fluid displacement container using a pressurized fluid. The fluid displacement container reduces the length of fall of food product by providing a liquid surface near the top of the container. As the liquid is displaced by the food product, it leaves the container through a drain located near the top of the container.

The present invention comprises improvements in aqua farming. They are especially beneficial in the types of aqua farming described above.

DISCLOSURE

The present invention provides a filtration system for the water that is applied to plants in aqua farming by the Minnich methods. The methods are made more effective and more economical as they provide purer, and thus healthier, bodies of water for any fish or other aquatic life therein, by bringing nutrients effectively to the root zones of the plants; keeping the roots from becoming overly soaked (having "wet feet"), by assuring adequate capillary action; and improving control of the water level under the plants.

A typical system for aqua farming according to the invention comprises at least one land mass typically approximately rectangular with the sides typically at least about an order of magnitude longer than the ends and defining approximately parallel channels in an adjacent body of water. Typically the water moves into the channels, and in a substantial region of each land mass, it also moves through the land mass from the channel on one side to the channel on the other side thereof.

Filtering means (typically comprising sand, gravel, plastic chips or shavings, crushed brick, glass, slag, charcoal, coal, or the like, or mixtures thereof) block the movement through the land masses of most of the pieces of solid matter that may be present in the water, whose smallest cross section is larger than a predetermined size.

The land masses typically are spaced apart side by side and approximately parallel, with a channel between each one and the next; and typically the water is directed so as to flow around the land masses and into the channels.

Typical systems comprise blocking means between successive land masses at the ends thereof for preventing water in the channels from flowing beyond the land masses. Typically each blocking means comprises a gate that can be lowered into the water in the channel when it is desired to block the flow of water, and can be raised when it is desired to permit the water to flow past the gate.

The direction of flow of water through the land masses typically is reversed from time to time to remove a substantial proportion of any solid matter that may be present in the filtering means.

DRAWINGS

CARRYING OUT THE INVENTION

Figure 1:
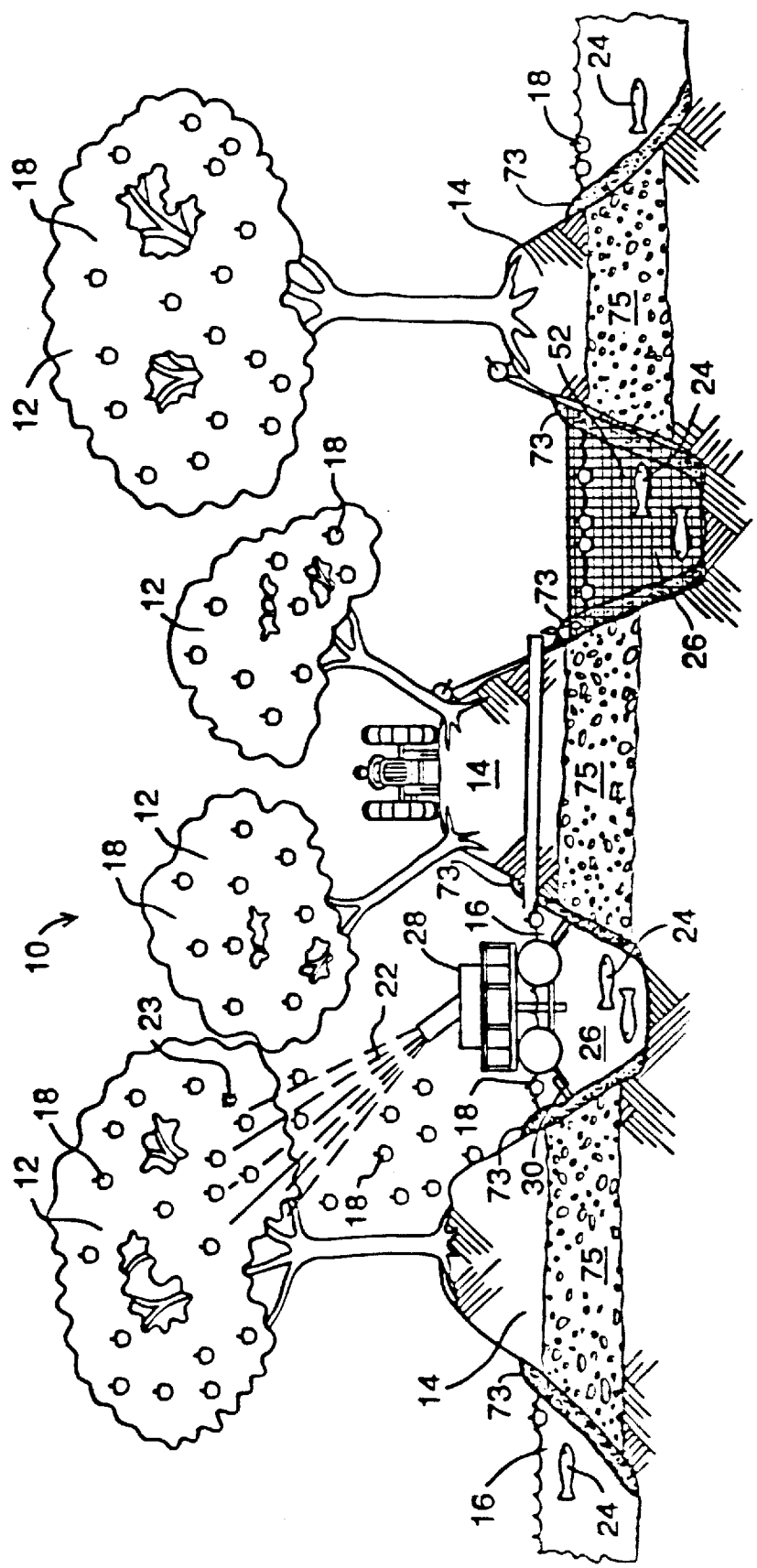
FIG. 1 is an elevational view in cross-section showing a typical arrangement of water, land, plants, and harvesting equipment for Minnich-type aqua farming including a typical water filtering system according to the present invention.

Referring now to the drawings, and largely to FIG. 1, a typical system 10 for aqua farming according to the present invention comprises an arrangement of adjacent land masses 14 and a body of water 16 for growing plants such as trees 12. The plants are located on land masses 14 so that separated plant parts such as apples 18 enter into the water 16. The plants parts 18 are then gathered from the body of water 16.

The apples 18 typically are removed from the trees 12 with a pressurized fluid stream 22, comprising a combination of pressurized water and compressed gas, which may also be used to remove insects 23 from the plants 12. Since most of the insects fall into the water, they provide a good source of food for the fish 24 and other aquatic animals that live in the body of water 16.

The land masses 14 typically are sloped sufficiently to urge the plant parts 18 to enter the water through the force of gravity. It is desirable for a good portion of the plant to extend out over the water so that most of the plant parts 18 fall directly into the body of water 16. This avoids damage to the plant parts from falling to the ground, especially when the plant parts are fruits such as apples, oranges, pears, and similar fruits. To further minimize the damage to the small amounts of plant part products that fall on the land mass, grass typically is planted on the land masses to cushion the fall of the plant parts and avoid bruising.

Typically aquatic animals 24 such as fish are raised in the body of water 16 and subsequently are collected or harvested therefrom. Other aquatic animals that may be raised in and around the body of water 16 include frogs, crustaceans, clams, and so forth. Aquatic plants may also be grown in the water 16.

Figure 3:
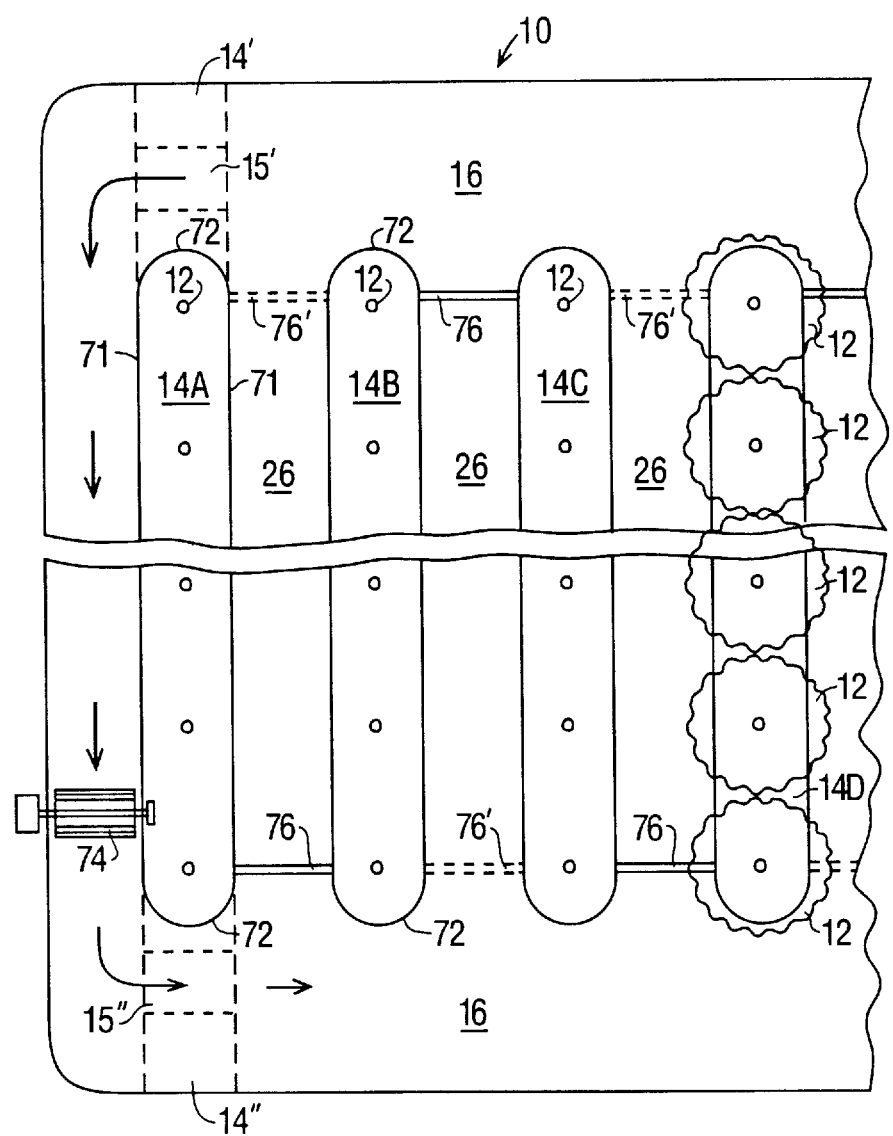
FIG. 3 is a schematic top view, partly sectional, of a typical aqua farming system as in FIGS. 1 and 2, with the right hand portion omitted. Typically the omitted portion is approximately a mirror image of FIG. 3; typically with the paddle wheel omitted.

As shown in FIG. 3, the body of water typically is fashioned in the form of canals or channels 26 that are located on the sides of each land mass 14. Although only the essential features of the canals are shown in the figures, it is to be realized that they can extend for long distances in a manner that conforms to the overall contour of the land. Preferably, the canals 26 are of a substantially uniform width that allows watercraft such as a pontoon boat 28 to navigate them with ease when gathering plant and animal products, removing debris, etc.

Other typical details in currently preferred Minnich aqua farming systems are described in the Related Patent cited above. Such details may be desirable in some embodiments of the present invention, but are not absolutely essential thereto.

Figure 2:
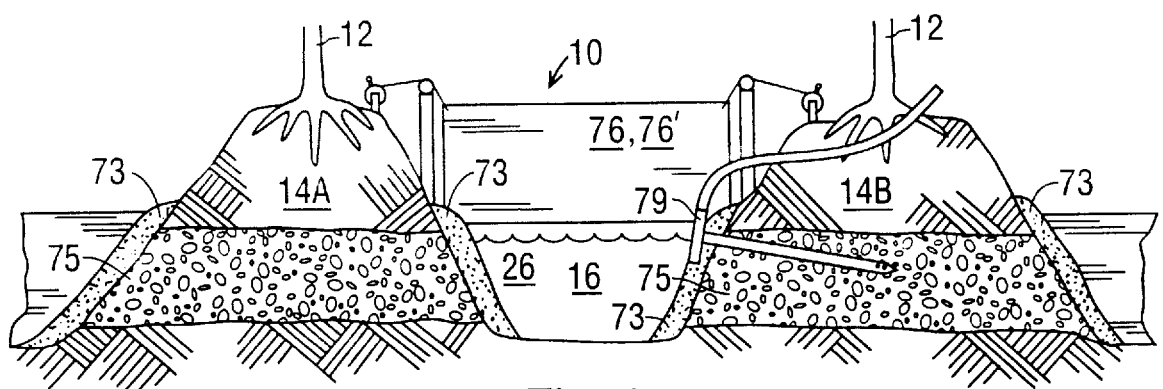
FIG. 2 is a similar view of a typical portion of the water filtering system in FIG. 1, and including further details thereof.

Referring now especially to FIGS. 2 and 3, a typical system 10 for aqua farming according to the present invention comprises at least one land mass 14, typically a plurality of approximately rectangular islands and/or peninsulas 14A, 14B, etc. with their sides 71 substantially longer than their ends 72 and defining approximately parallel channels 26 in an adjacent body of water 16; means, such as a paddle wheel 74 or a natural force, for providing movement of the water 16 in the channels 26; in a substantial region of each land mass 14A,14B, etc., means, such as open spaces between the sides of the land mass 14, for permitting movement of water through it from the channel 26 on one side to the channel 26 on the other side thereof; and, in the movement permitting means, filtering means 75 for blocking the movement through the land masses 14 of most of the pieces of solid matter that may be present in the water 16, whose smallest cross section is larger than a predetermined size. Typically the sides 71 of each land mass 14 are at least about an order of magnitude longer than the ends 72.

Typical systems comprise also, around each land mass, fine filtering means 73 extending from the bottom of each adjacent channel 26 to at least a few centimeters above the top of the water 16 and comprising an outer layer 73 of fine sand or gravel or a mixture of sand and gravel, to stop much of the most undesirable material in the water 16 where it can be removed easily from the system. Typically the material in the outer layer 73 is predominantly about 0.3 to 1 centimeter in diameter.

A typical system comprises also means for growing plants 12 on each land mass 14; means 22 for separating plant parts 18 from the plants 12 from time to time; means for moving the separated parts 18 into the body of water 16; and means for gathering them therefrom. The system typically comprises also means for growing aquatic animals 24 in the body of water 16 and means for harvesting them therefrom.

In a typical system according to the invention, the land masses 14 are so constructed and arranged as to be spaced apart side by side and approximately parallel, with a channel 26 between each land mass and the next; and the movement providing means typically comprises means 76,76' for directing the water 16 into the channel 26; typically from opposite ends in successive channels 26. The directing means typically comprises blocking means 76 between successive land masses 14 for preventing water in the channel 26 between the said land masses 14 from flowing beyond them at one end thereof. The same blocking means 76 also prevents water 16 from entering any channel 26 at that end.

In some typical embodiments of the invention, each blocking means 76 comprises a gate that can be lowered into the water in the channel 26 when it is desired to block the flow of water, and can be raised when it is desired to permit the water to flow past the gate.

Typically the filtering means 75 comprises sand, gravel, or a mixture of sand and gravel, in a substantial region of each land mass 14 adjacent to the water in the channels 26 on each side thereof.

Some typical embodiments of the invention comprises also means for reversing, from time to time, the direction of flow of water 16 through each land mass 14 to remove a substantial proportion of any solid matter that may be present in the filtering means 75.

Where the means for moving the water comprises a paddle wheel 74 therein, the direction reversing means typically comprises means for reversing the direction of rotation by the paddle wheel 75. Where the direction of flow of water in the system is controlled by the combination of open and closed positions in a plurality of blocking means 76 76', the reversing means typically comprises means for changing the combination of positions in the blocking means 76,76' from a combination (e.g.,with those 76 shown by solid lines in their lower (blocking) positions, and with those 76' shown by dashed lines in their upper (unblocking) positions, as in FIG. 2) that provides flow in a first set of directions, to a combination (e.g., with those 76 (solid lines) unblocking, and with those 76' (dashed lines) blocking) that provides flow in a second set of directions that is opposite in each land mass to the direction of flow therethrough in the first set of positions.

Some typical embodiments of the invention comprise other means for removing, from time to time, a substantial proportion of any solid material that may be present in the filtering means, by forcing water to flow therethrough in the direction opposite to the direction of flow during normal aqua farming operations. For example, the forcing means may comprise a fluid-injecting tool 79 such as shown in FIG. 2. Such a tool, commonly known as a pressure injection rod or water injection rod, typically has a non-clogging tip.

A typical method of aqua farming according to the invention comprises providing at least one land mass 14 defining approximately parallel channels 26 in an adjacent body of water 16; providing movement of the water 16 in the channels 26; providing, in a substantial region of each land mass 14A,14B, etc., means for permitting movement of water through it from the channel 26 on one side to the channel 26 on the other side thereof; and providing, in the movement permitting means, filtering means 75 for blocking the movement of most of the pieces of solid matter that may be present in the water 16, whose smallest cross section is larger than a predetermined size.

Typically plants 12 are grown on each land mass 14, and, from time to time, plant parts 18 are separated from the plants, moved into the body of water 16, and gathered therefrom. Also aquatic animals 24 typically are grown in the body of water 16 and are harvested from time to time.

A typical method of preparing a system for aqua farming according to the present invention begins by grading the land on which the land masses 14 and channels 26 are to be located, to a reasonably smooth and approximately level surface; then spreading over the area that is to be aqua farmed, to a height of about 15 to 30 centimeters, sand, or gravel of various sizes predominantly in the range of about 0.4 to 5 centimeters in diameter, or a mixture of such sand and gravel; removing the sand, gravel, or mixture from the areas where the channels are to be located; and placing the excavated sand, gravel, or mixture on top of the remaining strips thereof to form portions of the land masses. Depending on what is to be grown on the land masses 14, earth soil also may be placed on top of the underlying mixture in each land mass.

In typical systems for aqua farming, especially those in which aquatic animals 24 are to be grown in the body of water 16, it is desirable to have liners 73 around each land mass 14A, 14B, etc. to provide over each filter 75 an outer layer 73 that will stop much of the most undesirable material where it can be removed easily from the system. Thus the main portion of the filter 75 need not be cleaned as often as it would without the fine "prefiltering" by the liner 73. The liners 73 typically should extend from the bottom of each channel 26 (and of the end regions of the water 16) to at least a few centimeters above the top of the water 16. The liners 73 typically are about 10 to 20 centimeters thick and extend about 4 to 10 centimeters above the water level. Typically they comprise coarse sand, small gravel, or both sand and gravel, predominantly about 0.3 to 1 centimeter in diameter.

Typically stop gates 76,76' are placed between successive land masses 14A,14B, etc., at least at alternate ends thereof as shown in solid lines 76 in FIG. 3. If the direction of flow in the channels 26 is to be controlled by stop gates 76,76' that are upwardly and downwardly movable, they typically are located at both ends of the land masses 14, as indicated additionally by the gates 76' shown in dashed lines in FIG. 3.

A paddle wheel 74 may be installed, typically as shown in FIG. 3, to provide the desired movement of water 16 in the channels 26 and through the filtering regions 75 in the land masses 14. In systems where large areas are involved, more than one paddle wheel may be required.

In other systems, where a stream or other body of water is moved by a natural force such as gravity, mechanical driving of the water, as by paddles wheels, usually is not needed.

In such systems the flow of water through the land masses 14 is all in the same direction (e.g., left to right in the drawings). It typically is convenient to have at least some of the land masses 14 extend to the surrounding land area at one end as shown in dashed lines at 14' or 14" in FIG. 3, or at both ends 14',14". Culverts 15',15" may be provided to bypass some of the water 16 where the flow through the land masses 14 would otherwise be more than the filters 75 could handle effectively.

In a mechanically driven system where the water 16 flows "around" the land masses 14, the land masses 14 may extend to the "mainland" at one or both ends as described above; and culverts 15',15" or the like are then required to provide a complete circuit through the system.

While the forms of the invention herein disclosed constitute currently preferred embodiments, many others are possible. It is not intended herein to mention all of the possible equivalent forms or ramifications of the invention. It is to be understood that the terms used herein are merely descriptive rather than limiting, and that various changes may be made without departing from the spirit or scope of the invention.

I claim:

1. A system for aqua farming comprising:

at least one land mass defining a plurality of channels within an adjacent body of water;

means for growing plants on each land mass; means for separating plant parts from the plants from time to time; means for moving the separated parts into the water; and means for gathering them from the water;

means for providing movement of the water in the channels;

in a substantial region of the land mass, means for permitting movement of water through the land mass from the channel on one side to the channel on the other side thereof; and in the movement permitting means, filtering means for blocking the movement through the land mass of most of the pieces of solid matter that may be present in the water, whose smallest cross section is larger than a predetermined size.

2. A system as in claim 1, comprising also, around each land mass, fine filtering means extending from the bottom of each adjacent channel to at least a few centimeters above the top of the water and comprising an outer layer of fine sand or gravel or a mixture of sand and gravel, to stop much of the most undesirable material in the water where it can be removed easily from the system.

3. A system as in claim 2, wherein the material in the outer layer is predominantly about 0.3 to 1 centimeter in diameter.

4. A system as in claim 1, wherein the sides of each land mass are at least about an order of magnitude longer than the ends.

5. A system as in claim 1, comprising also means for growing aquatic animals in the water and means for harvesting them therefrom.

6. A system as in claim 1, wherein a plurality of land masses are so constructed and arranged as to be spaced apart side by side, with a channel between each land mass and the next; and the movement providing means comprises means for directing the water into the channels.

7. A system as in claim 6, comprising blocking means between successive land masses for preventing water in the channel between the said land masses from flowing beyond them at one end thereof.

8. A system as in claim 7, wherein the blocking means comprises a gate that can be lowered into the water in the channel when it is desired to block the flow of water, and can be raised when it is desired to permit the water to flow past the gate.

9. A system as in claim 1, wherein the filtering means comprises sand, gravel, or a mixture of sand and gravel, in a substantial region of each land mass adjacent to the water in the channels on each side thereof.

10. A system as in claim 9, comprising also means for reversing, from time to time, the direction of flow of water through each land mass, to remove a substantial proportion of any solid matter that may be present in the filtering means.

11. A system as in claim 10, wherein the means for moving the water comprises a paddle wheel therein, and the direction reversing means comprises means for reversing the direction of rotation by the paddle wheel.

12. A system as in claim 10, wherein the direction of flow of water in the system is controlled by the combination of open and closed positions in a plurality of blocking means, and the reversing means comprises means for changing the combination of positions in the blocking means from a combination that provides flow in a first set of directions to a combination that provides flow in a second set of directions that is opposite in each land mass to the direction of flow therethrough in the first set.

13. A system as in claim 9, comprising also means for removing, from time to time, a substantial proportion of any solid material that may be present in the filtering means, by forcing water to flow therethrough in the direction opposite to the direction of flow during normal aqua farming operations.

14. A system as in claim 13, wherein the forcing means comprises a fluid-injecting tool or the like.

15. A method of aqua farming comprising:

providing at least one land mass defining a plurality of channels within an adjacent body of water;

growing plants on each land mass; separating plant parts from the plants from time to time; moving the separated parts into the water; and gathering separated plant parts from the water;

providing movement of the water in the channels;

providing, in a substantial region of each land mass, means for permitting movement of water through the land mass from the channel on one side to the channel on the other side thereof; and providing, in the movement permitting means, filtering means for blocking the movement of most of the pieces of solid matter that may be present in the water whose smallest cross section is larger than a predetermined size.

16. A method as in claim 15, wherein the step of providing filtering means includes grading the land on which the land masses and channels are to be located, to a reasonably smooth and approximately level surface;

spreading over the area that is to be aqua farmed, to a height of about 15 to 30 centimeters, sand, or gravel of various sizes predominantly in the range of about 0.4 to 5 centimeters in diameter, or a mixture of such sand and gravel;

removing the sand, gravel, or mixture from the areas where the channels are to be located; and placing the excavated sand, gravel, or mixture on top of the remaining strips thereof to form portions of the land masses.

17. A method as in claim 16, wherein is included a step of placing earth soil on top of the underlying mixture in each land mass.

18. A method as in claim 16, wherein is included a step of placing stop gates between successive land masses, at least at alternate ends thereof.

* * * * *